March 29, 1966 R. PARNES ETAL 3,243,645

POST DEFLECTION FOCUSING CATHODE RAY TUBE FOR COLOR TELEVISION IMAGES OF HIGH BRIGHTNESS AND LOW RASTER DISTORTION

Filed Aug. 1, 1962 5 Sheets-Sheet 1

INVENTORS
ROBERT PARNES
JOHN PETRO
PAUL RAIBOURN
BY Pennie, Edmonds, Morton, Barrows and Taylor
ATTORNEYS March 29, 1966 R. PARNES ETAL 3,243,645

POST DEFLECTION FOCUSING CATHODE RAY TUBE FOR COLOR TELEVISION IMAGES OF HIGH BRIGHTNESS AND LOW RASTER DISTORTION

Filed Aug. 1, 1962 5 Sheets-Sheet 2

INVENTORS
ROBERT PARNES
JOHN PETRO
PAUL RAIBOURN

BY Pennie, Edmonds, Morton, Barrows and Taylor
ATTORNEYS

INVENTORS
ROBERT PARNES
JOHN PETRO
PAUL RAIBOURN
BY Pennie, Edmonds, Morton, Barrows and Taylor
ATTORNEYS March 29, 1966 R. PARNES ETAL 3,243,645

POST DEFLECTION FOCUSING CATHODE RAY TUBE FOR COLOR TELEVISION IMAGES OF HIGH BRIGHTNESS AND LOW RASTER DISTORTION

Filed Aug. 1, 1962 5 Sheets-Sheet 4

INVENTORS
ROBERT PARNES
JOHN PETRO
PAUL RAIBOURN
BY Pennie, Edmonds, Morton, Barrows and Taylor
ATTORNEYS March 29, 1966 R. PARNES ETAL 3,243,645

POST DEFLECTION FOCUSING CATHODE RAY TUBE FOR COLOR TELEVISION IMAGES OF HIGH BRIGHTNESS AND LOW RASTER DISTORTION

Filed Aug. 1, 1962 5 Sheets-Sheet 5

INVENTORS
ROBERT PARNES
JOHN PETRO
PAUL RAIBOURN
BY Pennie, Edmonds
Morton, Barrows and Taylor
ATTORNEYS 3,243,645
Patented Mar. 29, 1966

3,243,645

POST DEFLECTION FOCUSING CATHODE RAY TUBE FOR COLOR TELEVISION IMAGES OF HIGH BRIGHTNESS AND LOW RASTER DISTORTION

Robert Parnes, New York, N.Y., John Petro, Belleville, N.J., and Paul Raibourn, Southport, Conn., assignors to Paramount Pictures Corporation, New York, N.Y., a corporation of New York Filed Aug. 1, 1962, Ser. No. 213,958
6 Claims. (Cl. 315—15)

The present invention relates to cathode ray tubes for the reproduction of color television images, and more particularly to such tubes of the so-called post deflection focusing class in which an electron-permeable electrically conducting electrode is disposed on the side of the phosphor screen facing the electron gun and in which a grid of generally parallel wires is disposed a short distance back from the screen toward the gun, with a large potential applied to accelerate the electrons from the grid to the screen and to focus them on the screen in so doing. More specifically, the invention relates to such tubes in which the phosphor screen includes a multiplicity of sets of phosphor strips extending generally parallel to the wires of the focusing grid just mentioned, at least one strip of each primary color being provided in each such set. In such tubes, color selection may be effected either by selection of the angle at which the electrons approach the grid, as with multi-gun or "spun beam" tubes or by the application of switching voltages between the wires of the focusing grid, which are then divided into two sets of interlaced mutually insulated conductors. Both types are described in Patent No. 2,692,532. The present invention is applicable to both types.

The invention provides tubes of these types having an improved arrangement of focusing and accelerating electrodes, and a method of operating such tubes by means of which there is achieved a higher brightness for given video resolution or alternatively a higher video resolution for a given brightness in the reproduced picture, and a reduced distortion of the raster.

The brightness of the picture produced in a television tube is dependent on the velocity with which the electrons strike the fluorescent screen, i.e., upon the potential difference through which they have been accelerated since emission from the cathode. It also depends of course on the current in the cathode ray beam. Approximately, the brightness varies as the three halves power of the voltage and it varies approximately linearly with beam current.

Other things being equal, it is desirable to obtain as bright a picture as possible. Increase in beam current however entails growth in the diameter of the cathode ray beam because of the mutual repulsion of the electrons therein, and hence growth in the diameter of the spot produced by the beam on the fluorescent screen of the tube. This means loss of video resolution. In general, the smaller the spot size, the greater the available video resolution. However in tubes of the kind with which the present invention is concerned, wherein the screen includes a multiplicity of sets of phosphor strips and wherein there is provided a focusing grid of conductors generally parallel to the long dimension of the strips, the grid being spaced from the screen by a small part of the distance from the electron gun to the screen, there exists a lower limit below which it is not desirable to reduce the spot size. If it is made excessively small by comparison with the spacing of the grid conductors, undesirable moire patterns may appear on the screen. In practice, a spot size at the plane of the grid of the order of twice the grid wire spacing is desirable. The product of brightness and video resolution (the latter considered as a number increasing with the smallness of the detail that can be resolved) may however be regarded as a figure of merit of cathode ray tubes for color television, which it is desirable to raise.

It is, therefore, an object of the invention to provide a cathode ray tube for color television display, and a method of operation thereof, producing a high product of brightness and video resolution, and producing particularly a high brightness for a given accepted spot size on the screen. For increased brightness with optimum spot size, it is desirable to raise the average energy of the electrons in their flight from the gun to the grid, especially since spot size, although to a first approximation proportional to the first power of beam current, is to a first approximation proportional to the inverse three halves power of average beam voltage.

In accordance with the invention therefore, the average potential of the electrons in their flight between gun and grid is raised, without raising the ultimate voltage required at the fluorescent screen or the range of voltages required from the power supply, while preserving post deflection focusing with an accelerating voltage between grid and screen, ease of color selection between focusing grid and screen, and a distortion-free raster on the screen. To this end, in accordance with the invention, the electron beam or beams are accelerated in the electron gun or guns in which they are generated to substantially the maximum voltage available, and are then decelerated to an intermediate voltage at the grid before being reaccelerated to maximum available potential at the screen.

Further in accordance with the invention, the tube is provided with a system of electrodes which makes possible such acceleration, deceleration and reacceleration without substantial deleterious effect on the linearity with which the raster is scanned, so that the television image is reproduced with fidelity in shape.

The invention will now be further described with reference to the accompanying drawings in which.

Figure 7:
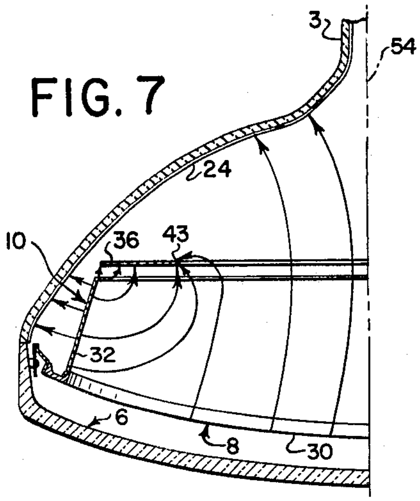
FIG. 7 is a fragmentary sectional view representative both of the one-gun tube of FIG. 1 (although taken in the plane of FIG. 3) and of the three-gun tube of FIG. 4, showing the general shape of the lines of force produced by the accelerating and focusing fields in that portion of the tubes of FIGS. 1 and 4 beyond the neck of the tube.
Figure 12:
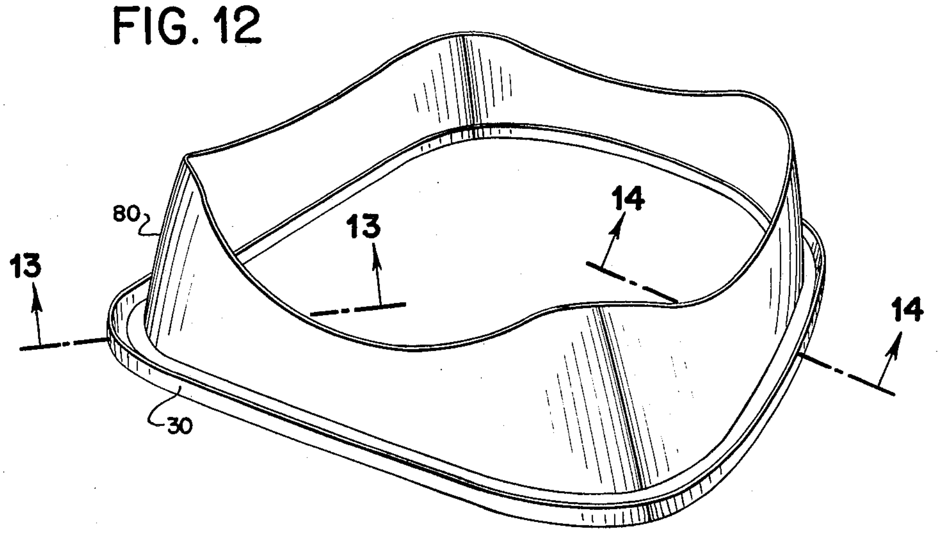
Figure 13:
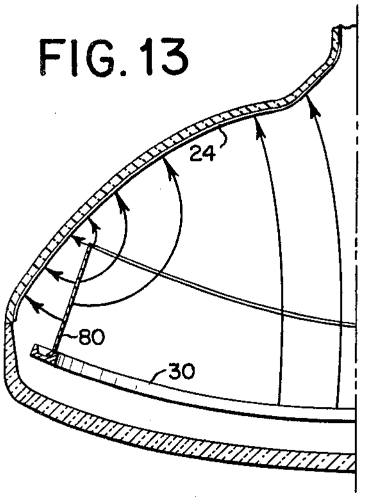
Figure 14:
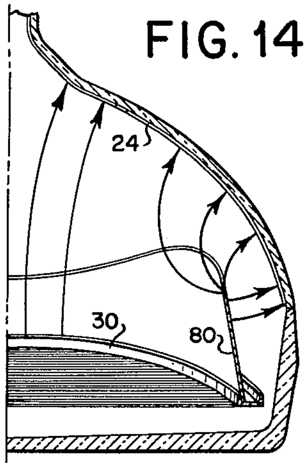

FIG. 12 is a perspective view of the raster distortion correcting electrode of the tube of FIGS. 13 and 14; and FIGS. 13 and 14 are two sectional views generally similar to FIG. 7 but taken on two meridians 90° apart, of still another form of cathode ray tube according to the invention.

Figures 1, 3:
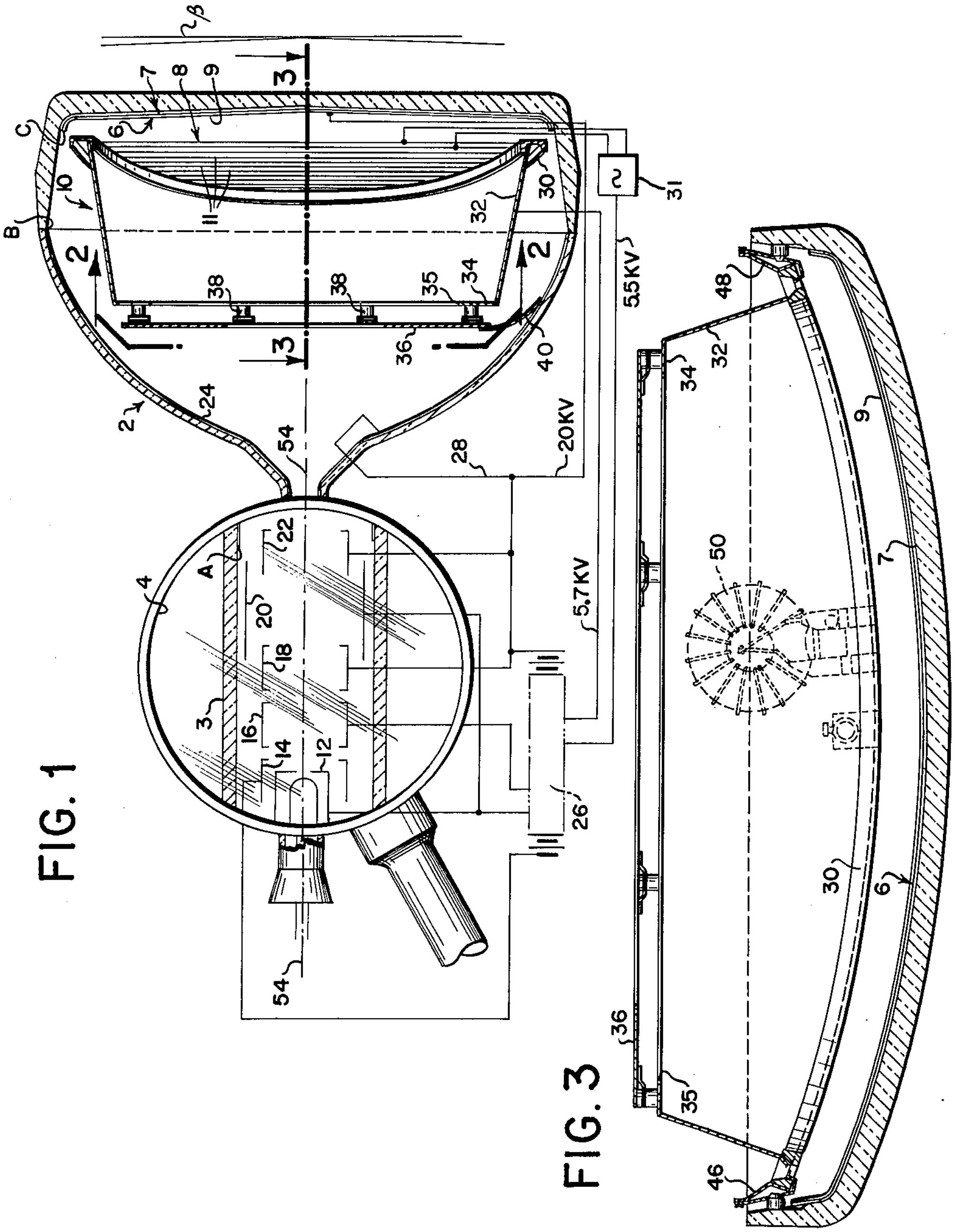
FIG. 1 is an axial section, along the minor axis of the tube face, of one form of cathode ray tube according to the invention employing a single cathode ray beam.
FIG. 3 is a sectional view taken on the line 3—3 of FIG. 2.

The cathode ray tube of FIG. 1 includes an envelope generally shown at 2, an electron gun of which the electrodes are shown in magnified form within a circle 4 representative of a magnifying glass, a viewing screen generally indicated at 6, a focusing grid generally indicated at 8 and an electrode structure generally indicated at 10. The screen 6 is, in the example illustrated, of generally cylindrical shape, as a comparison of FIGS. 1 and 3 indicates. The electron gun includes a cathode 12, a control grid 14, a first anode 16, a second anode comprising two elements 18 and 22, and a focusing electrode 20. The electron gun, i.e. elements 12, 14, 16, 18, 20 and 22, may be of conventional construction, and therefore need not be further described. The inside surface of the envelope 2 includes an electrode in the form of a conductive coating 24 which extends from a location A to the rear of the front limit of the anode 22 down to a location B forward of the rear edge of the electrode structure 10. The coating 24 may indeed extend to the screen 6, which includes not only a multiplicity of sets of phosphor strips 7 but also an electrically conducting electron permeable layer 9 on the rear or gun side of the phosphors. The layer 9 is shown as extending back to a limit C, where it is contacted by a lead from the power supply presently to be described. The phosphor strips 7 and layer 9 are shown with exaggerated thickness in FIG. 1.

A source 26 of voltages is shown at 26. It provides a range of direct current potential differences which may be of the order of 20,000 volts. All of the electrodes thus far recited are connected to this potential source by suitable leads as indicated. The leads to electrodes 24, 9 and to the grid 8 may pass through the envelope via appropriate lead-through devices, not shown. If the potential of the cathode 12 is considered to be zero, the control grid 14 may be connected to the potential source to make that grid negative with respect to the cathode by a small amount, of the order of 100 volts or so. The first anode 16 is then operated at a potential which may be a few hundred volts positive with respect to the cathode, while the elements 18 and 22 of the second anode and electrode 9 are operated at high positive potential, of the order of 20,000 volts. The electrode 20, which is provided to effect focusing of the electron beam in conjunction with anodes 18 and 22, is operated at or near the potential as the cathode.

The elements 12, 14, 16, 18, 20 and 22 function to develop an electron beam, to accelerate it, and to focus it on the surface of the grid 8. The voltages applied to these elements are selected to effect such focusing in view of the voltages existing on the grid 8 and electrode structure 10, presently to be described. In a multi-gun tube, a separate set of the elements 12, 14, 16, 18, 20 and 22 is provided for each gun.

In accordance with the invention, the electrode 24 is operated at the same potential as are anodes 18 and 22, either by means of a suitable lead-through conductor led through the envelope as diagrammatically illustrated at 28, or by means of conducting spring fingers affixed to the electrode 22 and bearing against electrode 24. The conductor 28 or the spring fingers, whichever is employed, thus serve to short-circuit the first tubular electrode 24 to the second accelerating electrode 22 of the gun. The screen electrode 9 is also operated at the full accelerating potential of 20,000 volts. This may be effected by the provision of a lead-through, in a conventional manner, or by the provision of a conductive strip or coating extending between electrodes 24 and 9. On the other hand, the grid 8 is operated at a much lower voltage, which may for example be of the order of 5,500 volts.

The grid comprises a multiplicity of wires 11 strung across a grid frame 30 to extend parallel to the plane of FIG. 1 and perpendicular to the plane of FIG. 3. The construction of such a grid is shown for example in Patent No. 2,928,968, and need not be given here in detail. In tubes employing a single electron gun and in which color selection is effected by means of microdeflection voltages, as is explained for example in Patent No. 2,745,033, the wires 11 are divided into two mutually insulated interlaced sets. An alternating current voltage of color subcarrier frequency, or of frequency harmonically related thereto, is then applied between the two sets of grid wires by means of a generator 31, the peak to peak value of this voltage being of the order of 500 volts. In tubes in which color selection is effected by control of the angle at which the electrons approach the grid 8, as for example by the provision of three guns in a plane perpendicular to the wires 11, all of the wires 11 are at the same potential. In either event, a mean potential is assigned to the grid wires by a lead connected either to one of them or to the generator last referred to. As above mentioned, with a cathode to scereen voltage interval of 20,000 volts, this mean grid potential may be of the order of 5,500 volts.

As already stated, the screen 6 is operated at high potential, normally at the highest potential available from the power supply. The grid 8 is operated at substantially one-fourth the potential of screen 6, and the electron gun is operated with its second, i.e., its final anode 18, 22 at high potential, higher than that of grid 8, advantageously the same as that of the screen 6. Accordingly, the electrons of the cathode ray beam emerge from the last electrode 22 of the electron gun with high potential, i.e. travelling at high velocity. In accordance with the invention they are kept at this high velocity by provision of the electrode 24 which causes the space at the potential of electrode 24 to extend part way towards grid 8.

In consequence of this mode of operation, with the cathode ray beam accelerated in the electron gun to a potential higher than that of grid 8, the average voltage and hence the average velocity of the electrons in their flight from the electron gun to the grid is substantially higher, and the time required for that flight is substantially shorter, than in the cathode ray tubes of the prior art wherein the electrons move at constant potential between the electron gun and the grid. The time during which the mutual repulsion of the electrons acts to increase the beam cross-section is thus reduced, with consequent reduction in spot size for given beam current, or with consequent increase in permissible beam current (and hence in brightness of the picture produced) for given spot size and video resolution. That is to say, by means of the increased average velocity of the electrons imparted thereto by the operation of the gun and of electrode 24 at a potential above that of the grid 8, the product of brightness and video resolution already referred to is increased.

In accordance with another feature of the invention, means are provided to secure a relatively distortion-free raster on the screen or target 6 of the cathode ray tube.

Raising of the electron gun potential, i.e., of the final potential to which the electrons of the cathode ray beam are raised before emergence from the electron gun and maintenance of the beam electrons at such an elevated potential until approach to the focusing grid by means of the beam surrounding electrode 24 at final gun potential increases the average potential of the beam electrons in their passage from gun to grid with improvemen in obtainable product of brightness and video resolution as hereinabove explained. However, between the grid 8 and this extension of the electron gun there will exist a strong electrostatic field, which will act as a diverging lens on the beam electrons. This is perforce the result of the shape of the field between the grid 8, which is essentially flat, and the electrode 24, which is essentially tubular. This divergent field is moreover non-uniform over the raster, producing substantial pincushion distortion thereof.

Figure 2:
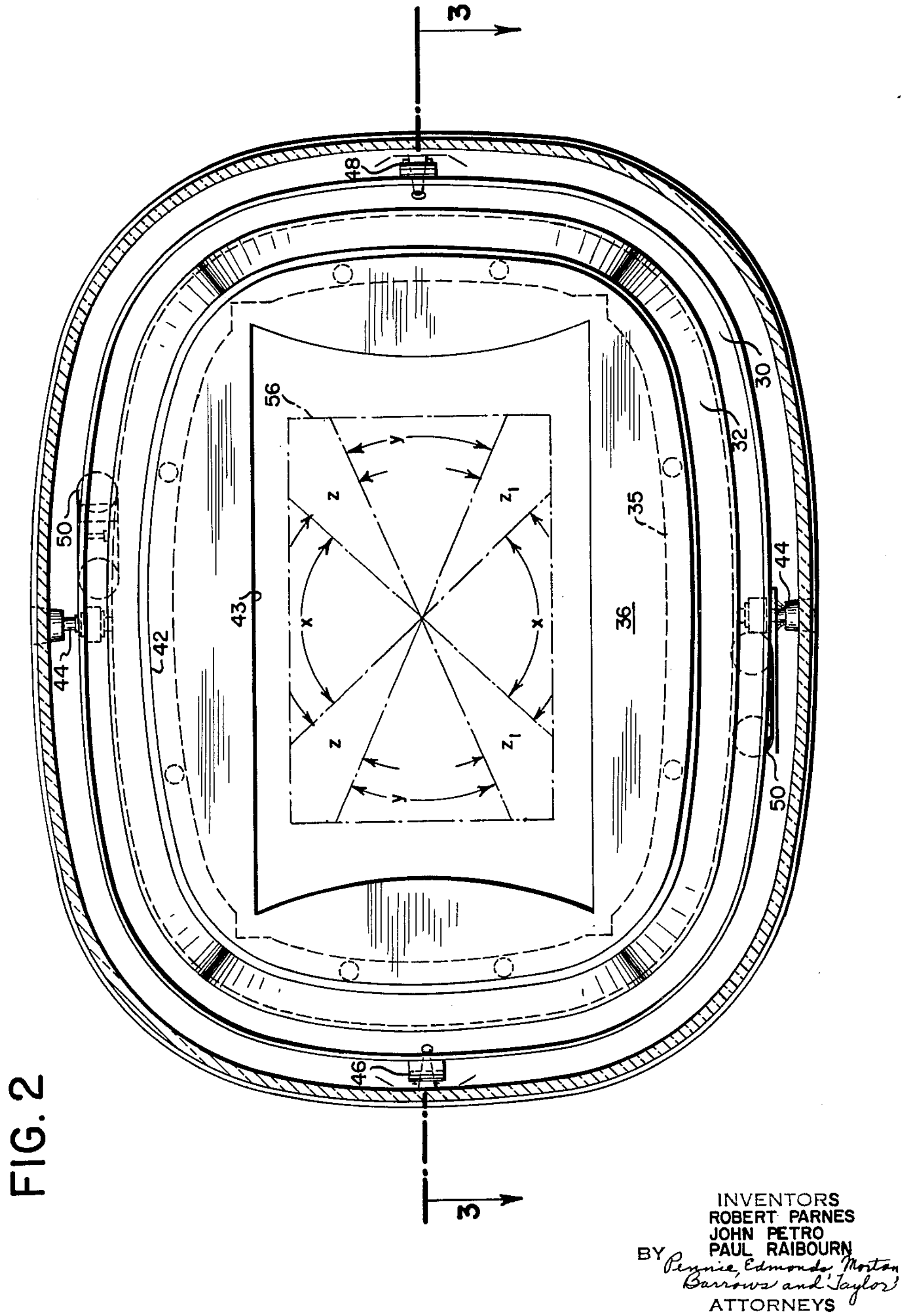
FIG. 2 is a sectional view at an enlarged scale taken along the line 2—2 in FIG. 1.
Figure 8:
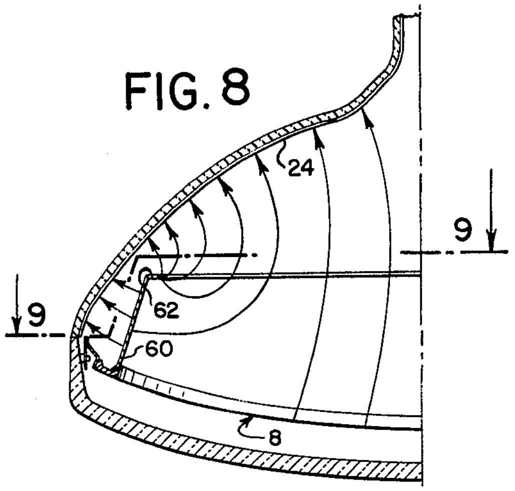
FIG. 8 is a sectional view similar to that of FIG. 7 but illustrating another form of cathode ray tube according to the invention which may be of either the one-gun or multi-gun type.
Figure 10:
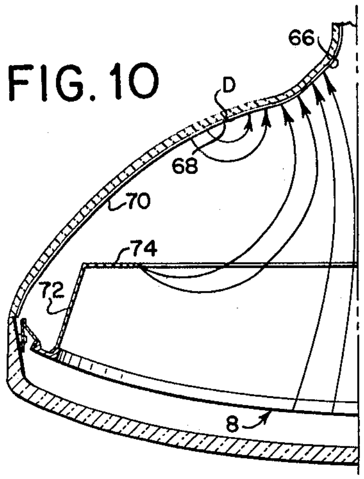
FIGS. 10 and 11 are sectional views similar to that of FIG. 7 but illustrating two further embodiments of the invention.
Figure 11:
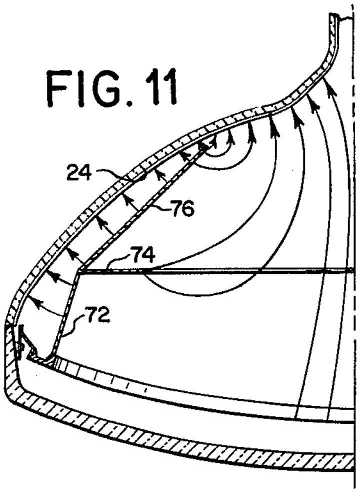

In accordance with the present invention this distortion is abated by provision of a funnel-shaped electrode at grid potential (shown at 32 in FIGS. 1 to 3, at 60 in FIG. 8, at 72 in FIGS. 10 and 11, and at 80 in FIG. 12) and by addition thereto of the apertured plate electrode 36 of FIGS. 1 to 3 at second anode potential, or of the apertured plate electrodes 62 of FIG. 8 and 74 of FIGS. 10 and 11 at grid potential, or by addition thereto of the variable height illustrated in the embodiment of FIGS. 12 to 14.

Considering more specifically first the embodiment of FIGS. 1 to 3, there is affixed to the frame 30 from which the wires of the switching and focusing grid of that tube are supported a basically tubular or conical electrode 32 which, like the grid frame 30, operates at low potential. Advantageously, the electrode 32 is operated at a potential a few hundred volts higher than the mean potential of the wires 11 in order to collect secondary electrons which may be produced by impact of the electron beam on those grid wires. In tubes of the type now-customarily called "rectangular," wherein a raster of non-unity aspect ratio is traced, the electrode 32 possesses generally the shape of the frustum of a pyramid. The slant height of the pyrimid is in the surface bearing reference character 32 in FIG. 2. At the upper or rear end (adjacent the gun), the electrode 32 may be provided with a flange 34 whose outline is shown at the dotted line 35 in FIG. 2.

An apertured electrode 36 of plate-shape is supported from the electrode 32 by insulators 38 and is operated at the full accelerating potential of 20,000 volts. It may be connected to the 20,000 volt level in the power supply by means of a conductor 40 which resiliently bears against the conductive coating 24.

FIG. 2 shows the shape of the electrode 36. Electrode 36 comprises a flat sheet of conducting material of roughly oblong exterior outline shown at 42. An aperture 43 is cut therein through which the electron beam passes to the grid 8 and for impact on the screen 6. The grid 8 together with the electrodes 32 and 36 are supported from the grid frame 30 which in turn is supported at three studs, 44, 46 and 48, molded into the envelope 2 if the latter is made of glass.

As will be apparent on comparison of FIGS. 1 and 2, the screen 6 is laid down on an approximately cylindrical surface at the end of the envelope 2 remote from the electron gun, and the grid 8 is likewise of approximately cylindrical surface. The screen 6 includes a multiplicity of sets of strips of three phosphors of three colors, the length of the strips and the wires of the grid both extending parallel to the plane of FIG. 1 and perpendicular to the plane of FIG. 3.

FIG. 3 shows in dotted outline at 50 a resonant circuit which may be provided in embodiments employing grid switching for color selection. This circuit is connected between the two sets of wires 11 of the grid 8 in order to control and improve the variation with time of the voltage difference between the two sets of grid wires. The resonant circuit is shown in dotted form in FIG. 3 because it lies behind the conical wall of electrode 32. Two such resonant circuits 50 are customarily provided as indicated in FIG. 2.

The details of the construction by which the wires of the grid 8 are supported from the grid frame are not of importance to an understanding of the present invention and have therefore not been shown.

The operation of the electrodes 32 and 36 in conjunction with electrode 24 to secure a distortion-free raster will be described in connection with FIGS. 7 to 15. Since this feature of the invention, as well as the provision of a high potential electrode such as the electrode 24 of FIGS. 1 to 3 surrounding the beam in its flight from the gun to the focusing grid is applicable in accordance with the invention to both single and multiple gun tubes, the description thereof in connection with FIGS. 7 to 14 will be undertaken after a description of a three-gun embodiment of the tube of the present invention, illustrated in FIGS. 4 to 6.

Figures 4, 5, 6:
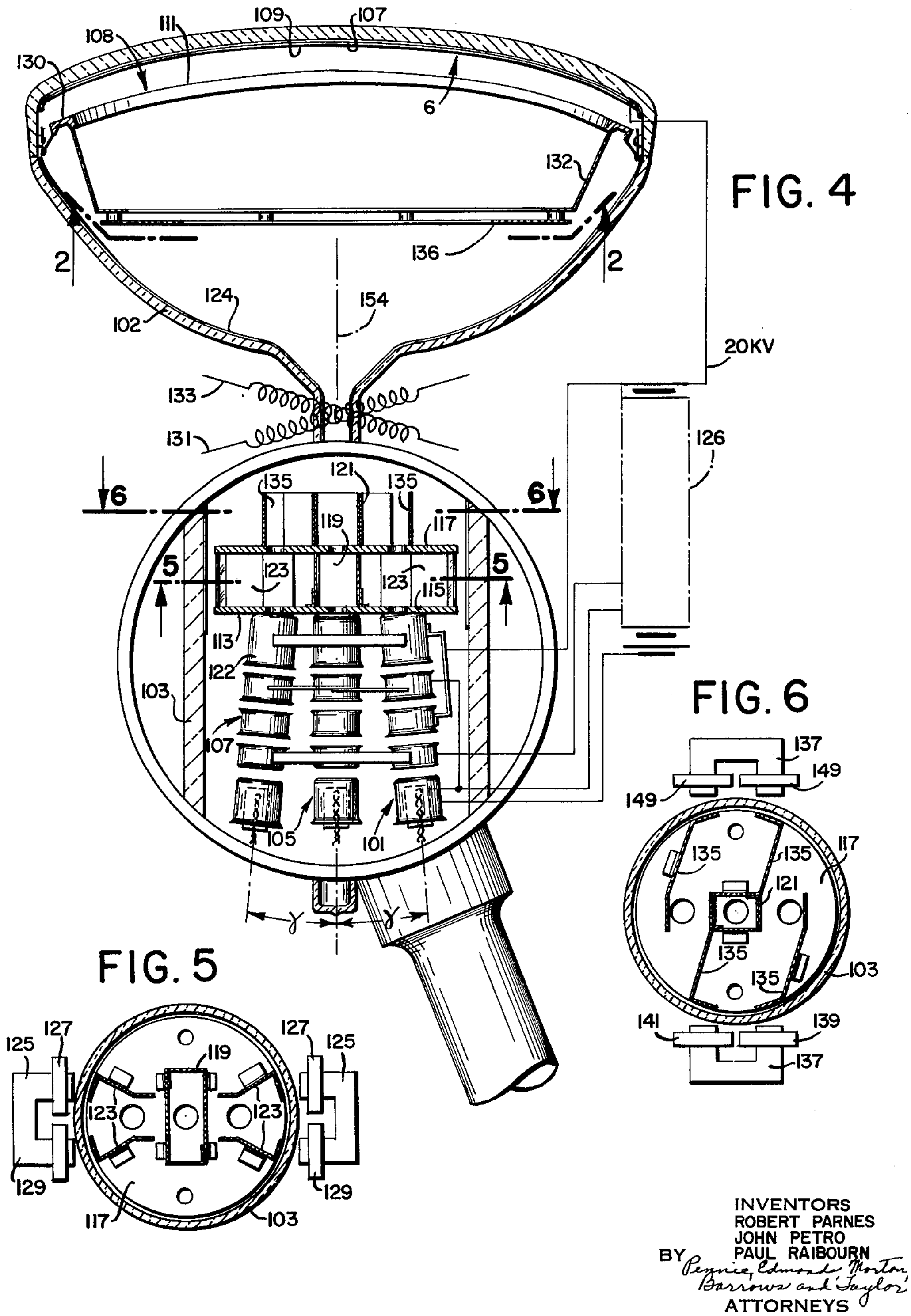
FIG. 4 is an axial section, along the major axis of the tube face, of a three-gun cathode ray tube according to the invention having three cathode ray beams.
FIG. 5 is a sectional view at an enlarged scale taken on the line 5—5 of FIG. 4.
FIG. 6 is a sectional view at an enlarged scale taken on the line 6—6 of FIG. 4.

The tube of FIGS. 4 to 6 includes an envelope 102 which may be similar to the envelope 2 of FIG. 1 except insofar as the neck 103 of the tube of FIG. 4 may be required to be larger than the neck 3 of FIG. 1 in orler to accommodate three electron guns 101, 105 and 107 and except that the fluorescent screen 6 may be laid down on a truly cylindrical surface having an axis perpendicular to the tube axis 154. Each of these guns may be similar to the electron gun of FIG. 1, and each raises the beam of electrons generated thereby to a high potential, which may be 20 kv. for example. The guns 101, 105 and 107 are provided one for each of the three primary colors, usually red, green and blue. In one form of receiver with which the tube of FIGS. 4 to 6 may be operated to reproduce the so-called N.T.S.C. color-subcarrier color television signal, all three guns receive a wide band luminance signal extending from substantially zero frequency out to a nominal four megacycles. Separate red, green and blue color difference signals R–Y, G–Y, and B–Y signals extending from substantially zero frequency to perhaps 0.5 megacycle are then applied in addition, one to each of the guns 101, 105 and 107 to modulate the beam current thereof.

The guns 101, 105 and 107 are positioned within the neck 103 at a slight inclination to each other so that in the absence of line and field deflection voltages, the three beams will converge at the intersection of the tube axis 154 with the grid 108 thereof. Dynamic convergence means may be provided, to be described in connection with FIGS. 5 and 6, to preserve this convergence over the raster notwithstanding the tendency, absent such dynamic convergence means, for the position of convergence of the three beams to recede from the grid toward the neck of the tube with increasing deflection angle.

The grid 108 is a structure similar to the grid 8 of FIGS. 1 to 3, except that the grid wires 111 of FIG. 4, in contrast to the wires 11 of FIGS. 1 to 3, are all connected electrically together to be operated at the same potential. Conveniently wires 111 are connected to the grid frame 130.

The electrodes 124, 109, 132 and 136 of FIG. 4 may be similar to those of FIGS. 1 to 3 which bear corresponding reference characters one hundred less in value, and may be operated at voltages similarly related among themselves as are the voltages of the corresponding electrodes in FIGS. 1 to 3.

In the tube of FIGS. 1 to 3 the pattern of phosphor strips 7 on the target area of the tube includes, as disclosed for example in Patent No. 2,731,582, to phosphor strips per wire in a so-called "double color" strip pattern such as RGBGRGBG wherein adjacent red and blue strips are electron-optically centered behind adjacent of the wires 11. In the tube of FIG. 4 in contrast, one phosphor strip of each color is provided for each grid wire, the strip sequence being RGBRGB for example. In view of this larger number of strips, it may be convenient to use in a tube according to FIG. 4 a coarser pitch or spacing of the adjacent wires.

The construction of the electron guns of the tube of FIG. 4 and the dynamic convergence means associated therewith are illustrated in FIGS. 5 and 6. In FIG. 4 the three electron guns 101, 105 and 107 are seen, adjacent guns being disposed with their axes inclined to each other at a small angle $\alpha$. The axis of the middle gun 105 is advantageously made to coincide with the tube axis 154. The front electrodes 122 of the three guns are secured to a plate 113, bent along a large radius of curvature, and having an opening at the axis of each of the guns. Plate 113 is secured to a similar apertured plate 115, which is however flat and disposed perpendicularly to the tube axis 154. Between plate 115 and a further similar plate 117 are provided the means, illustrated in FIG. 5, for effecting dynamic convergence in respect of correcting the deflection of the beams from the outside guns 101 and 107 in planes parallel to that of FIG. 4 in order to maintain convergence over the raster. In front of plate 117 are provided the means, illustrated in FIG. 6, for correcting the deflection of the beams from guns 101 and 107 in planes perpendicular to that of FIG. 4 in order to maintain convergence over the raster.

The beam from the middle gun 105 is shielded from these dynamic correction means by means of a shielding enclosure 119 between plates 113 and 117 and by means of a shielding enclosure 121 in front of plate 117. To supplementarily deflect the beams of guns 101 and 107 along the major axis of the raster for maintenance of dynamic convergence, i.e., parallel to the plane of FIG. 4, there is provided for each of these beams a pair of pole pieces 123 of ferro-magnetic material, affixed between plates 115 and 117. Electromagnets 125 are associated one with each of these pairs of pole pieces, magnets 125 being disposed outside the tube envelope.

The envelope should therefore in the neck portion of the tube here in question be of glass or other material not effective to provide magnetic shielding.

It is apparent from FIG. 5 that the fields of the two magnets 125 will deflect horizontally, i.e., in planes parallel to that of FIG. 4, the beams of guns 101 and 107 respectively. To adjust the amount of such deflection, each magnet carries separate windings 127 and 129. Windings 127 and 129 are fed with suitably proportioned parts of the horizontal and vertical deflection coil currents respectively, optionally superimposed on suitable D.C. currents. The magnetic polarities involved are so chosen that, in the case of both guns 101 and 107, the supplementary deflection fields produced by magnets 125 act in opposition to the main deflecting fields produced by the line and field deflection coils, which have been schematically indicated at 131 and 133 in FIG. 4.

For corresponding correction of the deflection of the beams from the outside guns in planes perpendicular to that of FIG. 4, FIG. 6 shows additional pairs of pole pieces 135 and similar magnets 137 having coils 139 and 141 connected to the horizontal and vertical scanning circuits of the receiver through suitable current proportioning devices, not shown, as in the case of coils 127 and 129.

Single gun tubes such as those of FIGS. 1 to 3 advantageously include a target surface, on which the screen 6 is disposed, of compoundly curved shape. This surface approximates a combination of two cylinders having axes inclined to each other at a small angle $\beta$, indicated in FIG. 1. In consequence, the phosphor strips 7 are preferably laid down by an electronic printing process such as that described in U.S. Patent No. 3,067,349, in which a given grid 8 is employed, in a demountable tube, to lay down on a face plate by means of an electron beam scanned therethrough over a normal raster, an image or images representative of one or more of the sets of difference by colored phosphor strips. In such a process, each grid is destined for use with a single face plate, the grids and face plates being not interchangeable.

Multi-gun tubes such as that of FIGS. 4 to 6 may in contrast possess a viewing screen formed on a single cylindrical surface, on which the pattern of phosphor strips may be laid down by a printing method, as for example with a roller.

To return now to those features of the invention which correct for distortion of the raster occasioned by the decelerating field between the electrode 24 of FIG. 1 or 124 of FIG. 4 and the grid 8 of FIG. 1 or 108 of FIG. 4, attention is directed to FIGS. 2 and 7 to 14. In FIG. 7 there is shown a plot of the electrostatic fields existing between the grid 8 and electrodes 32, 36 and 24 of FIG. 1. FIG. 7 is equally illustrative of the electrostatic fields existing between the grid 108 and electrodes 132, 136 and 124 of FIG. 4. In FIG. 4, the guns 101, 105 and 107, the grid 108 and the electrodes 132, 136 and 124 are connected to a power supply 126 in the same manner as are the corresponding elements of structure in FIG. 1 with the exception that in FIG. 4 the wires 111 are all at the same potential, illustratively 5.5 kv. The alternating switching potentials present in a one-gun tube according to FIG. 1 may, for total accelerating potentials of the order of 20 kv., be some 500 volts in peak to peak amplitude, and have at most a small effect on the matter of raster distortion and correction now under consideration.

The operation of the invention in respect of raster correction is therefore represented by FIG. 7 for both single and multiple gun tubes, and the same is true of the modified tube structures according to the invention illustrated in FIGS. 8 to 14. The following description of FIGS. 7 to 14 is thus applicable to multiple as well as single gun tubes, notwithstanding the use in those figures of certain reference characters from FIGS. 1 to 3. Moreover, FIG. 7 (and each of FIGS. 8, 10 and 11) represents a meridian or axial section of the tubes of FIGS. 1 and 4 along the major axis of the raster thereof, in consequence of which the trace of the grid 8 is curved in each of those figures. As respects the sign of the curvature of the field lines and the resulting convergent versus divergent shape of the field between the grid 8 and electrodes 10, 32 and 36 on the one hand and electrode 24 on the other however those plots are also correctly representative of the influence on the electron beam or beams in the perpendicular meridan.

The fields of FIGS. 7, 8, 10, 11, 13 and 14 are represented by lines of force extending, perpendicularly to the equipotential surfaces, from locations of lower to locations of higher potential.

Referring again to FIG. 7, it will be recalled that the grid 8 and electrode 32 are at substantially the same potential (illustratively 5.5 and 5.7 kv.) while electrodes 36 and 24 are at substantially higher potential (illustratively 20 kv.). In the post deflection focusing tubes to which the invention relates, it is desirable that the potential of grid 8 be substantially one-fourth the potential of the screen (i.e., of conducting electron-permeable film 9). The small potential difference of some 200 volts between the potential or mean potential 5.5 kv. of the wires 11 of grid 8 and the 5.7 kv. potential of electrode 32 is provided to effect collection at electrode 32 of secondary electrons produced by impact of the cathode ray beam on the wires 11. In view of its small value by comparison with the other voltage differences being considered, this difference of 200 volts has been disregarded in FIG. 7.

The resulting fields betwen grid 8, electrode 32 and electrodes 36 and 24 possess the shape indicated by the force lines of FIG. 7. To the cathode ray beam or beams passing from the interior of the tube neck 3 towards the screen this field is divergent in effect, and increasingly so as the beam departs from the tube axis 54 under influence of the line and field scanning or deflecting fields. These scanning fields are conveniently provided by magnetic deflection coils 131, 133 (FIG. 4) disposed about the neck of the tube exteriorly thereof in well-known fashion.

The consequence of the non-uniform divergent shape of this field is that the raster traced on the screen is afflicted with pincushion distortion.

Provision in accordance with the invention of the electrode 32 having substantial height along the tube axis, and operation thereof at the potential of grid 8 shifts the transition region between the grid (e.g., 5.5 kv.) and second anode (e.g., 20 kv.) potentials from the immediate vicinity of the grid part way back towards the electron guns and thus reduces, in dimensions perpendicular to the tube axis, the area over which this divergent lens action takes place. This reduction is a consequence of the nature of the scanning process, the beam or beams having been less widely deflected from the tube axis, in linear measure, at points closer to the source of deflection than at points farther therefrom. By this means alone therefore the non-uniformity of the divergent lens action across the raster is reduced, and the pincushion distortion imposed on the raster by operation of the electron gun at a potential above that of grid 8 is also reduced. An undesirable amount of distortion however remains. In the embodiments of FIGS. 1 and 4 this remaining distortion is further reduced or eliminated by the provision of the electrode 36 (136 in FIG. 4) operated also above the potential of the grid, and possessed in both embodiments of the aperture of reentrant shape indicated at 43 in FIG. 2.

As indicated in FIG. 7 the field lines are directed outwardly in and near the plane of electrode 36, especially in portions of that plane away from the tube axis 54. They therefore are divergent in their affect on cathode ray electrons from the gun or guns. They are moreover crowded together in the immediate vicinity of the edge of the aperture 43 where, as is usual with a sharp edge or point, the potential gradient is high. In FIG. 7, the spacing of the field lines at the plane of electrode 36 is seen to increase with progress from the edge of aperture 43 towards the tube axis.

In accordance with the invention, advantage is taken of this property of the field at an edge to reduce the pincushion distortion of the raster traced on screen 6 by giving to the aperture 43 itself a reentrant, e.g., pincushion shape. The trace, in the plane of electrode 36, of the raster is indicated approximately by dashed rectangular line 56 in FIG. 2. This line 56 is also representative of the trace of the raster produced in the plane of electrode 136 in FIG. 4 by the three guns of the tube of FIGS. 4 to 6. It will be seen that this line approaches the electrode 36 more closely at the sides of the raster than it does at the corners thereof. Consequently, the cathode ray beam or beams are more subjected to divergent lens action in the lateral sectors X and Y (FIG. 2) of the raster than in the corner sectors Z thereof. The result is compensation for the non-uniformly divergent lens action between electrodes 24 and 32.

It will be understood from the foregoing description that the electrode 36 does not act as a collimating aperture, limiting by mechanical interception of the beam electrons the shape of the raster traced on the screen of the cathode ray tube.

Figure 9:
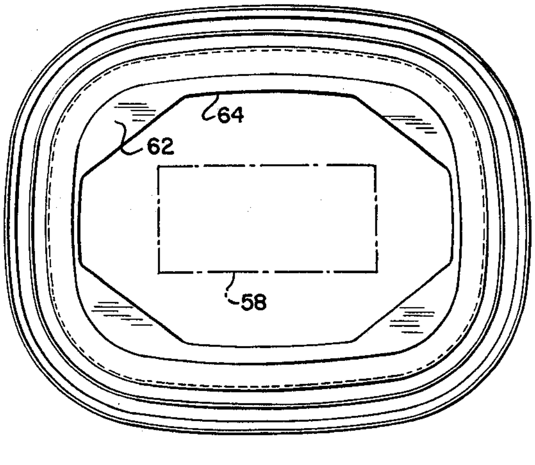
FIG. 9 is a sectional view corresponding to that of FIG. 2 but for the embodiments (whether one-gun or three-gun) of FIG. 8, FIG. 9 being taken on the line 9—9 of FIG. 8.

FIG. 8 illustrates another embodiment of the invention, applicable to both one-gun and multiple-gun tubes. Here, as in FIG. 7, the electrode 24 operated at second anode potential extends nearly down to the position (along the tube axis) of grid 8. Here also a tubular or funnel-shaped electrode 60, similar in shape to electrodes 32 and 132 of FIGS. 1 and 4, is operated at grid potential and shifts back toward the gun end of the tube the transition region between gun potential and grid potential (20 kv. and 5.5 kv. in the example assumed). At the gun end of electrode 60, and electrically continuous therewith, is provided an apertured electrode 62 having an aperture 64 of non-reentrant shape, as illustrated in FIG. 9. The field plot of FIG. 8 shows that the field across the aperture at the upper end of electrode 60 is convergent, rather than divergent, and that it is of decreasing intensity for positions closer to the tube axis. A convergent field is therefore added to the basically divergent field which exists above electrode 60 as indicated by the outwardly directed field lines there. The pincushion distortion imposed upon the raster by this latter field is compensated by giving to the aperture in electrode 60 the non-reentrant shape bounded by line segments concave toward the tubes axis, indicated at 64 in FIG. 9. The trace 58 of the raster at the plane of electrode 62 (trace 58 being shown in FIG. 9 as in the case of trace 56 in FIG. 2. In approximate shape without regard for the presence of either barrel or pincushion distortion) is seen to approach closer to the edge 64 of electrode 62 at the corner sectors of the raster than at the lateral sectors thereof. The convergent field existing over the aperture 64 is thus made more effective in the corner than in the lateral sectors of the raster, and the result is compensation of the pincushion distortion already present in the raster by reason of the action of the field between electrodes 60 and 24 above electrode 62.

FIG. 10 illustrates still another embodiment of the invention, again applicable to both single and multi-gun tubes, wherein an electrode 66, analogous to electrode 24 of the previous figures and similarly operated at second anode potential is terminated at a limit D which is at a relatively short distance beyond the neck and down the conical or approximately conical slope of the tube. Beyond an insulating band 68 (e.g., of chrome oxide) an additional electrode 70 is provided in the form of a conductive coating on the inside surface of the tube envelope, which may be operated at the same potential of grid 8. In FIG. 10 as in the embodiments of the previous figures, a tubular or conical electrode is provided, indicated at 72, which is operated at grid potential and which extends from the periphery of the grid part of the distance back towards the neck of the tube. The electrode 72 may be similar in shape to the electrodes 32 and 60 of FIGS. 7 and 8.

In FIG. 10 as in FIG. 8, the field is convergent in the plane defined by the upper end of electrode 72. Consequently the aperture at that location is provided with an electrode 74, electrically continuous with electrode 72. Electrode 74 may have an aperture of substantially the same shape as the aperture 64 in electrode 62 of FIG. 9.

Still another embodiment of the invention is illustrated in FIG. 11, electrically similar to that of FIG. 10, and likewise applicable to both single and multi-gun tubes. In FIG. 11 the electrode 24 has the same shape as in FIGS. 7 and 8, but a second frusto-conical electrode 76 is mounted on and connected to the electrode 72, to provide within the tube, in the region traversed by the electron beams, a field configuration closely similar to that of FIG. 10. The electrode structure of FIG. 11 may in other respects be similar to that of FIG. 10.

FIGS. 12 to 14 illustrate still another embodiment of the invention applicable to both single and multiple-gun tubes. Here the flat plane electrode, such as the electrodes 36, 62 or 74 of FIGS. 7, 8, 10 and 11, is dispensed with. A single tubular or conical electrode 80 is provided, similar in shape and basic function to the electrodes 32, 60 and 72 of FIGS. 7, 8, 10 and 11, and likewise operated at the potential of grid 8. The field for the cathode ray beam or beams existing at the upper limit of electron 80 is convergent, and the pincushion distortion imposed on the raster in the region above electrode 80 is compensated for by giving to this electrode 80 a variable height as a function of meridional position around the tube axis.

The shape of the electrode 80 is indicated by the perspective view of FIG. 12, where it is seen in conjunction with the frame 30 of grid 8. The electrode 80 has maximum height at the corners of the raster, and a lesser height in the lateral portions thereof between these corners. FIG. 13 is a field plot for the tube incorporating the electrode 80 of FIG. 12 in a meridian passing through one such corner, and FIG. 14 is a similar plot for a meridian bisecting one of the straight sides. In both, the field in the vicinity of the upper edge of electrode 80 is convergent for beam electrons. By virtue of the greater height of the electrode in the meridian of FIG. 10 however the convergent field is stronger in FIG. 13 than in FIG. 14, and the consequence is a compensation of pincushion distortion in a manner similar to that achieved in FIGS. 5 to 8.

We claim:

1. A cathode ray tube comprising an envelope and an electron gun having a cathode and first and second accelerating electrodes, said tube further comprising a target spaced from said gun, a focusing grid intermediate said second accelerating electrode and target, a first tubular electrode partly in overlapping relation with said second accelerating electrode and extending from said second accelerating electrode toward said grid, a second tubular electrode extending from said grid toward said accelerating electrodes, and a raster distortion correcting electrode lying within said envelope and disposed in spaced relation thereto substantially in a plane perpendicular to the axis of said gun intermediate said second tubular electrode and gun.

2. A cathode ray tube comprising an envelope and an electron gun having a cathode and first and second accelerating electrodes, said tube further comprising a target spaced from said gun, a focusing grid intermediate said second accelerating electrode and target, a first tubular electrode partly in overlapping relation with said second accelerating electrode and extending from said second accelerating electrode toward said grid, a second tubular electrode extending from said grid toward said accelerating electrodes, and a beam-surrounding electrode disposed within said envelope and disposed in spaced relation thereto between said second tubular electrode and gun, said beam-surrounding electrode being connected to said first tubular electrode and having an aperture of reentrant shape therein.

3. A cathode ray tube comprising an envelope and an electron gun having a cathode and first and second accelerating electrodes, said tube further comprising a target spaced from said gun, a focusing grid intermediate said second accelerating electrode and target, a first tubular electrode partly in overlapping relation with said second accelerating electrode and extending from said second accelerating electrode toward said grid, a second tubular electrode extending from said grid toward said accelerating electrodes, and a beam-surrounding electrode disposed within said envelope and disposed in space relation thereto between said second tubular electrode and gun, said beam-surrounding electrode being connected to said second tubular electrode and having therein an aperture bounded by line segments concave toward the tube axis.

4. A cathode ray tube comprising an electron gun having a cathode and an accelerating electrode, said tube further comprising a target spaced from said gun, a focusing grid intermediate said accelerating electrode and target, a first tubular electrode extending from said accelerating electrode toward said grid, and a second tubular electrode extending from said grid toward said accelerating electrode, said second tubular electrode having a height parallel to the direction of flight of electrons from said gun to said target varying around the periphery of said second tubular electrode.

5. A cathode ray tube comprising an electron gun having a cathode and an accelerating electrode, said tube further comprising a substantially rectangular target spaced from said gun and substantially centered on an axis of said tube extending from said gun to said target, a focusing grid intermediate said accelerating electrode and target, a first tubular electrode extending about said axis from said accelerating electrode toward said target, and a second tubular electrode extending about said axis from said grid toward said accelerating electrode, said second tubular electrode extending farther towards said accelerating electrode in planes containing said tube axis which intersect said target diagonally than in planes containing said tube axis which are parallel to the sides of said target.

6. A cathode ray tube comprising at least one electron gun having a cathode and first and second accelerating electrodes, said tube further comprising a target spaced from said gun and disposed to be impacted by electrons from said gun, a multiplicity of side-by-side strips of phosphor fluorescent on electron impact in plural colors disposed on the target in a repeating cyclic order, an electron-permeable electrode overlying said phosphor strips on the side thereof adjacent said gun, a multiplicity of linear conductors arranged substantially parallel to said strips to constitute a grid, at least one said conductor being provided for each cycle of said strips, said grid spaced from said phosphors towards said gun to form with said electron-permeable electrode a multiplicity of cylindrical lenses upon the application of an electron-accelerating potential between said conductors and electron-permeable electrode, a first tubular electrode partly in overlapping relation with said second accelerating electrode and extending from said second accelerating electrode toward said grid, said first tubular electrode being short-circuited to said second accelerating electrode and providing a substantially field-free flight space from said second accelerating electrode at least part of the distance to said grid, a second tubular electrode extending from said grid toward said accelerating electrodes, and a raster distortion-correcting electrode lying within said envelope and disposed in spaced relation thereto intermediate said second tubular electrode and gun.

References Cited by the Examiner

UNITED STATES PATENTS

| | | | |
|---|---|---|---|
| 2,831,918 | 4/1958 | Dome | 178—5.4 |
| 2,890,379 | 6/1959 | Lee | 315—14 |
| 2,951,179 | 8/1960 | Evans | 315—15 |
| 3,016,474 | 1/1962 | Hergenrother | 315—16 X |
| 3,023,336 | 2/1962 | Frenkel | 313—78 |

OTHER REFERENCES

Webster's Third New International Dictionary, G. & C. Merriam Co., Springfield, Mass., 1959. pp. 2459–2460.

DAVID G. REDINBAUGH, *Primary Examiner.*

ROBERT SEGAL, *Examiner.*